(12) United States Patent
Korn et al.

(10) Patent No.: US 9,325,258 B2
(45) Date of Patent: Apr. 26, 2016

(54) WIRELESS CONTROL OF POWER NETWORK SWITCHING DEVICES

(75) Inventors: Arthur Korn, Baden (CH); Dacfey Dzung, Wettingen (CH); Guntram Scheible, Gorxheimertal (DE); Harald Vefling, Notteroy (NO); Anne Vallestad, Sandvika (NO)

(73) Assignee: ABB Research Ltd., Zurich (CH)

( * ) Notice: Subject to any disclaimer, the term of this patent is extended or adjusted under 35 U.S.C. 154(b) by 1051 days.

(21) Appl. No.: 13/444,218

(22) Filed: Apr. 11, 2012

(65) Prior Publication Data

US 2012/0207138 A1 Aug. 16, 2012

Related U.S. Application Data

(63) Continuation of application No. PCT/EP2009/063408, filed on Oct. 14, 2009.

(51) Int. Cl.
*H02M 7/5387* (2007.01)

(52) U.S. Cl.
CPC ................................ *H02M 7/53871* (2013.01)

(58) Field of Classification Search
None
See application file for complete search history.

(56) References Cited

U.S. PATENT DOCUMENTS

| | | |
|---|---|---|
| 2002/0018458 A1 | 2/2002 | Aiello et al. |
| 2003/0033026 A1 | 2/2003 | Murphy |
| 2004/0207264 A1 | 10/2004 | Sato et al. |
| 2005/0201340 A1 | 9/2005 | Wang et al. |
| 2005/0276255 A1* | 12/2005 | Aiello et al. ................. 370/348 |
| 2006/0173565 A1 | 8/2006 | Fertig et al. |
| 2008/0160923 A1 | 7/2008 | Celanovic et al. |
| 2008/0284252 A1 | 11/2008 | Jones et al. |
| 2009/0052431 A1 | 2/2009 | Kroener et al. |

FOREIGN PATENT DOCUMENTS

| | | |
|---|---|---|
| CN | 1311565 A | 9/2001 |
| DE | 19735942 A1 | 3/1999 |
| EP | 1396730 A1 | 3/2004 |
| EP | 2075657 A1 | 7/2009 |

(Continued)

OTHER PUBLICATIONS

The Patent Office of the People's Republic of China First Office Action Application No. 200980161932.1 Date: Mar. 28, 2014 10 pages.

(Continued)

*Primary Examiner* — Alex Skripnikov
(74) *Attorney, Agent, or Firm* — Whitmyer IP Group LLC

(57) ABSTRACT

A method for controlling a plurality of power converters connected to a power supply network is described. Each power converter includes high-power semiconductor devices. Control signals are sent between a controller and a wireless node of one or more of said plurality of power converters using a wireless communication system. The control signals are transmitted to a local wireless node of one or more of a plurality of power converters. The data transmissions include data packets including control information such that a clock of the local wireless node can be synchronized using time synchronization information of the wireless communication system. In other aspects of the invention a system employing the method and a computer program for carrying out the method are described.

22 Claims, 2 Drawing Sheets

(56) References Cited

FOREIGN PATENT DOCUMENTS

| | | | |
|---|---|---|---|
| JP | 2004088824 | A | 3/2004 |
| JP | 2007288842 | A | 11/2007 |
| WO | 2004114563 | A1 | 12/2004 |
| WO | 2006039823 | A2 | 4/2006 |
| WO | 2008044193 | A2 | 4/2008 |

OTHER PUBLICATIONS

International Search Report and Written Opinion of the International Searching Authority; Application No. PCT/EP2009/063408; Issued: Mar. 1, 2010; Mailing Date: Mar. 8, 2010; 10 pages.

Written Opinion of the International Preliminary Examining Authority; Application No. PCT/EP2009/063408; Issued: Nov. 21, 2011; 7 pages.

* cited by examiner

WIRELESS CONTROL OF POWER NETWORK SWITCHING DEVICES

CROSS-REFERENCE TO RELATED APPLICATIONS

The present application is a continuation of pending International Patent Application PCT/EP2009/063408 filed on Oct. 14, 2009 which designates the United States, and the content of which is incorporated herein by reference.

FIELD OF THE INVENTION

The present invention is concerned with communication between a power electronics controller and a network of high-power semiconductor switching devices. In particular it is concerned with wireless communication with a plurality of power converters, also known as electronic frequency converters and with synchronisation of said plurality of power converters.

BACKGROUND OF THE INVENTION

Electrical power networks are most often operated at a nominal and fixed voltage and frequency. The connection of certain types of equipment, such as for example generators, that output power with variable voltage and/or frequency may be accomplished using electronic frequency converters also known as power converters. There are different methods to generate gate switching signals to operate power converters, of which one known method is DTC (Direct torque control) and another well known method is PWM (Pulse width modulated). Power converters may be arranged to control a variable power output and convert it into an acceptable power input to a power network with fixed nominal characteristics. For example wind generators tend to have an electrical power output that varies with wind speed so that variation occurs in voltage and frequency of the generator output as wind speed varies. For example PWM power converters may be arranged to control and switch such variable power supplies so that a resulting power input into a power network matches the nominal fixed voltage and frequency.

A method for switching power converters is described in an international patent application WO 2006/039823 entitled "Signal transmission system for activating a power semiconductor switch, and a converter equipped with a signal transmission system of this type" assigned to ABB Research Ltd. WO 2006/039823 describes a signal transmission system which serves to activate at least one power semiconductor switch (S1, S2, ..., Sn) starting from a controller (11). At least one control signal can be transmitted from the controller (11) to at least one modulator (M1, M2, ..., Mn) via at least one first transmission path (3). It discloses that a wireless control signal and/or a drive signal to PWM power converters can be transmitted using an optical signal path.

US2008284252, entitled "Control methods for the synchronization and phase shift of the pulse width modulation (PWM) strategy of power converters" and assigned to Converteam Tech. Ltd., describes a method of controlling a plurality of power converters 1a, 1b and 1c that can be used to interface to a supply network, ac busbar, etc. Each power converter includes a network bridge 14 operating in accordance with a pulse width modulation (PWM) strategy having the same switching period. The method includes providing the switching period of each network bridge with a different time offset relative to a time datum such that at least one unwanted harmonic in the supply network voltage is at least partially cancelled. In other words, different timing signals are sent to different converters, and these timing signals are used to locally offset each converter's clock.

A technical challenge for such implementations is that communication between a controller and each converter requires a very fast communication link with latency of only some few microseconds µs. Alternatively, the local clock of each converter must be extremely accurate over a long period to maintain sufficient accuracy down to a few microseconds, which poses both technical issues and cost issues.

SUMMARY OF THE INVENTION

The aim of the present invention is to remedy one or more of the above mentioned problems.

This disclosure describes the use of wireless communication between a power electronics controller and a network of high-power semiconductor switching devices. Control decisions from a controller are transferred as wireless packets addressed to individual switches or groups of switches. In the communication system context, the controller is called the master and an individual switching device or a group of switching devices is called a slave or a node. The wireless air interface and protocol is designed such that wireless packets may only be transmitted in precisely defined slots in periodically repeated timing frames. Packets may contain the slot number and may also contain more coarse timing information such as frame number. In this way, a common measure of time can be maintained in all the nodes with a timing resolution at least as good as the slot-border resolution built into the wireless air interface.

Packets containing on/off switching decisions preferably also contain information about the point(s) in time in the future where switching is to take place. The control algorithm can have a significantly longer cycle time than the one required by the on/off timing resolution.

A preferred use of an embodiment of the invention is to use wireless communication between a power electronics controller and a number of high-power switching devices, for example in a power converter device. Such a converter typically consists of an AC/DC module for example a rectifier, and one or more DC/AC modules for example inverters. Each rectifier or inverter contains high-power semiconductor devices, for example IGCTs (integrated gate-commutated thyristors) which can be turned on and off at will. High voltages and large currents are normally present.

The control algorithm results in a sequence of decisions telling the individual switches (such as power converters) to turn on or off at specific points in time. Control decisions are transferred from the controller as wireless packets addressed to individual switches (eg converters) or groups of switches. Precise timing of the on/off control signals is imperative in order to minimize power losses and to avoid equipment damage caused by excessive currents. Required timing accuracy is in the range of 1 microsecond µs.

In the first place the use of wireless communication saves the cabling for the communication wires which are subject to ageing. Wireless communication also allows galvanic separation between the controllers and devices which are on high potential. It also facilitates reconfiguration of the power converter circuitry. A common measure of time for all of the nodes is established between the nodes and the controller. In addition separating the precise timekeeping from the control algorithm timing, and utilizing the precise timing inherent to time-slotted wireless protocols, provides a technical solution that reduces the performance requirements on both the controller and the transaction timing of the wireless protocol.

BRIEF DESCRIPTION OF THE DRAWINGS

A more complete understanding of the method and system of the present invention may be had by reference to the following detailed description when taken in conjunction with the accompanying drawings wherein.

Op 3 discloses the invention according to Op1 and in particular an alternative method for communication of control signals wherein processing of the control signals is carried out locally according to an embodiment of the invention; and Op 4 discloses the invention according to Op1 and in particular an alternative method for communication of control signals wherein control parameters are comprised in the control signals which are processed locally according to another embodiment of the invention.

Figure 2:
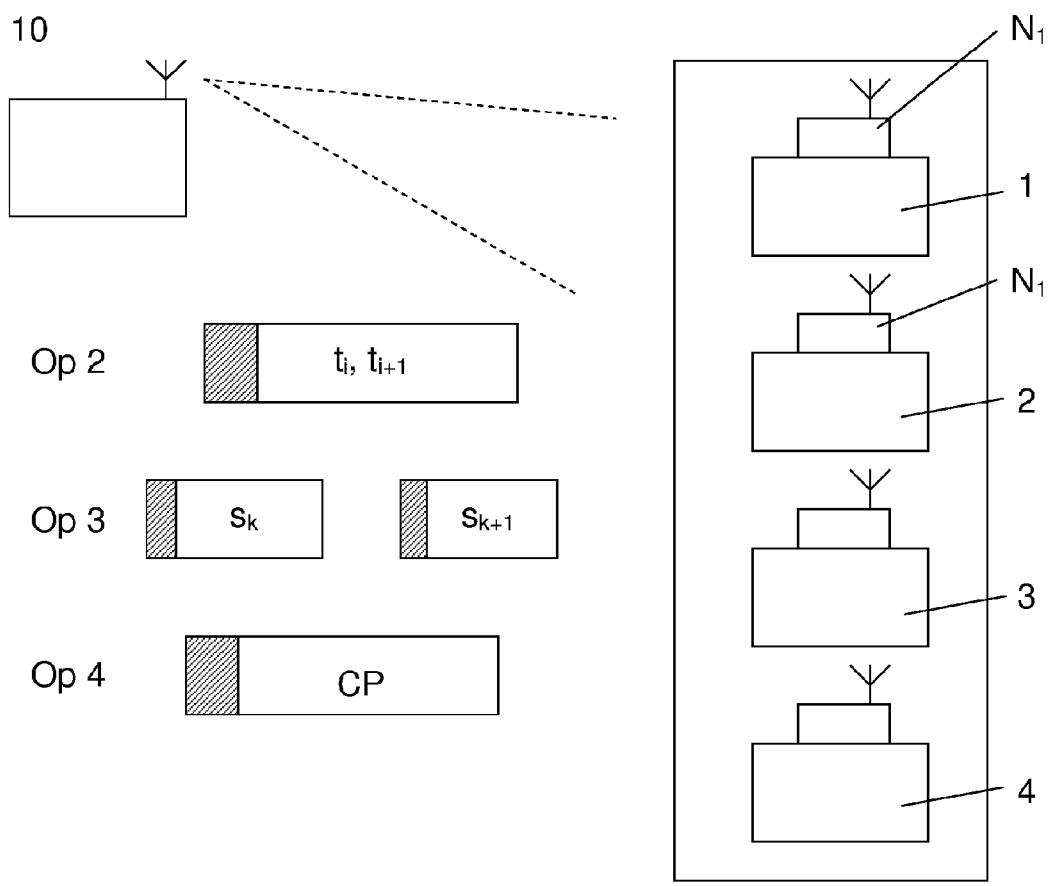
FIG. 2 shows a schematic diagram in which
Op 2 discloses a method for controlling a plurality of converters wherein communication of control signals is carried out wirelessly and each local wireless node is synchronised according to an embodiment of the invention.
Figure 3:
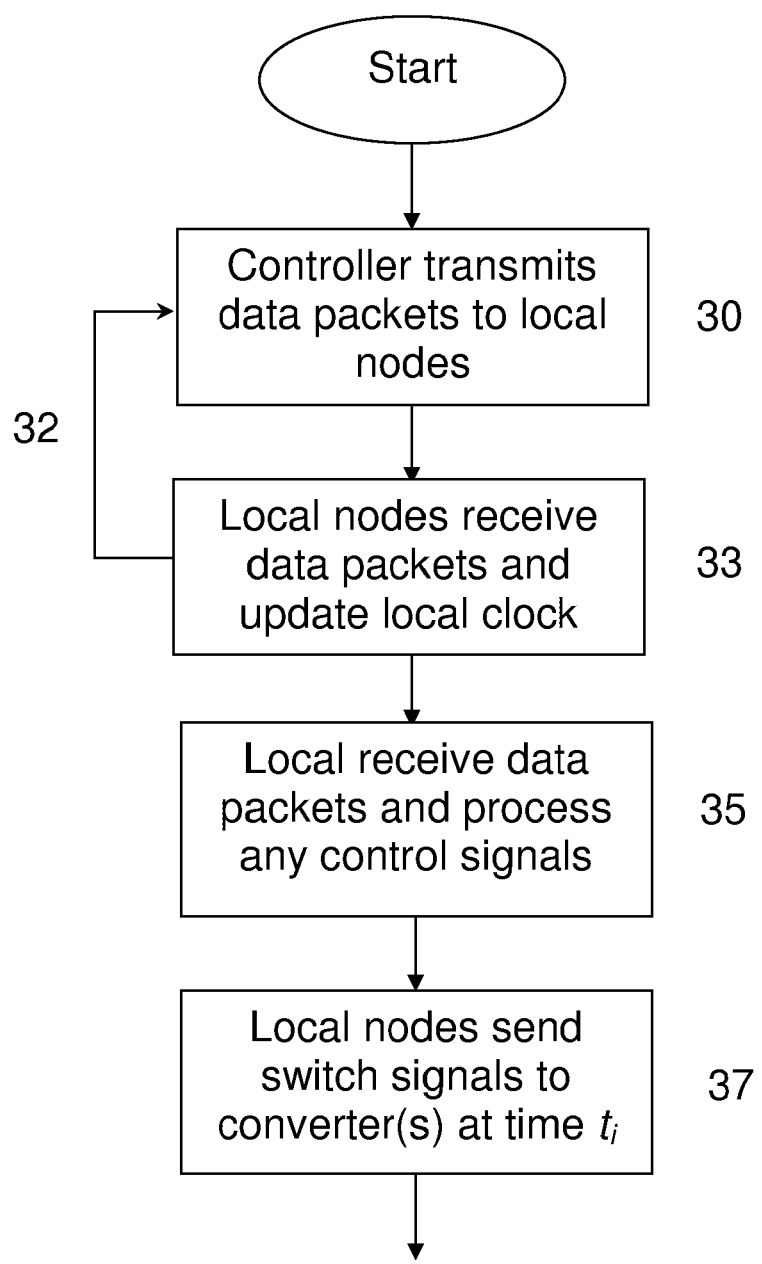

FIG. 3 shows a schematic diagram for a power network flowchart according to an embodiment of the invention shown in Op 2 of FIG. 2.

DETAILED DESCRIPTION OF THE INVENTION

Figure 1:
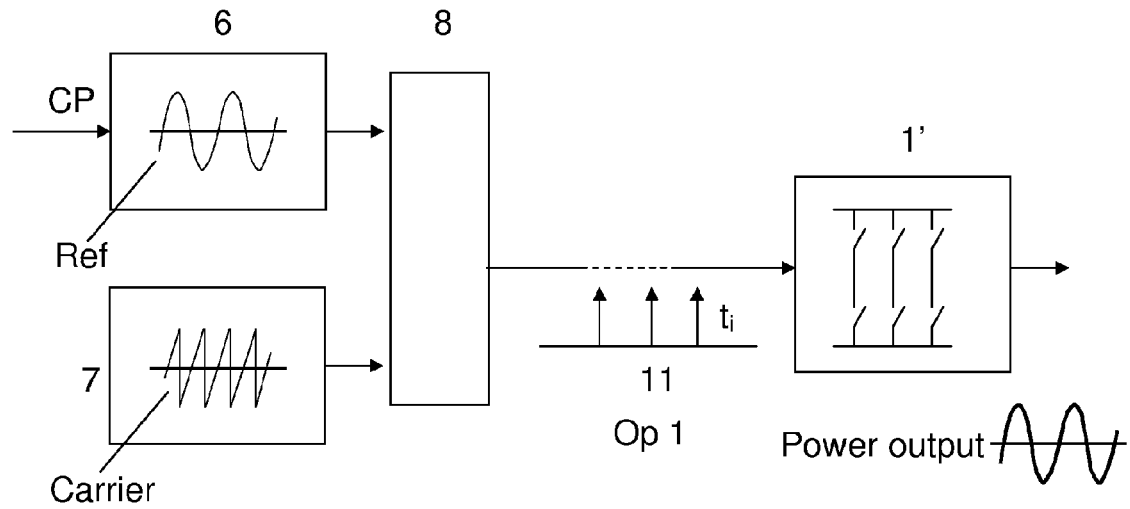
FIG. 1 (Prior Art) shows a schematic block diagram of a known system for PWM control of a number of power converters.

FIG. 1 (Prior art) illustrates a known Pulse Width Modulation (PWM) method used in high power semiconductor devices such as power converters. The figure shows a group of power converters 1' of a power network. A controller (not shown) generates two input signals 6 and 7. Signal 6 is a reference signal and corresponds to the desired voltage or current output from the converters when switched, typically a sinusoidal signal. Signal 7 is a carrier signal, typically a sawtooth signal.

The figure shows the basic elements of generation by the power electronics controller. The controller generates the two signals the reference signal 6, also called modulating signal s(t): It defines the desired waveform of the power converter output, which typically, is a sine wave of controllable frequency. The control parameters CP given from an external eg power network source to the controller specify this reference signal, and it includes
  (i) frequency (e.g. 50 Hz, or variable, say 200 Hz),
  (ii) amplitude, usually given as modulation index (=amplitude of reference signal/amplitude of carrier signal).

the carrier signal 7: This is typically a sawtooth signal at a high "switching frequency" of say 5 kHz.

These two signals enter a comparator 8. The time instants $t_i$ when the carrier signal intersects the modulating signal determine the gate switching signals that will be generated under the control scheme, which could, for example, be PWM; at $t_i$ a gate switching command (also called 'on/off command', or 'firing pulse') is sent to the converter. The sequence of switching commands to the power electronic gates in the converter produces the desired power output. The time accuracy of the switching commands must be in the order of microseconds μs. Options for distribution of intelligence between the controllers and the ensuing communication between master and slaves, with decreasing requirements on the communication links in terms of speed, are:

The method shown in Prior Art Op 1 is known from WO 2006/039823 and discloses a centralised control signal calculation using a very high speed communication line. The master performs the PWM generation and transmits the switching commands directly to the slaves at the switching time $t_i$. This is done in the centralized architecture (11, FIG. 1), typically over optical fibre. This method may be called asynchronous, as it requires no synchronization of the slaves: the slave receives the command from the master at the exact time it must issue (forward) the actual switching command to the gates in its module. On the other hand, this Prior Art method requires a very fast communication link with latency of some microseconds μs.

According to an embodiment of an aspect of the invention, there are a number of improved communication options for modular converters.

FIG. 2 shows an architecture concept according to an embodiment of the invention in the form of a modular converter 20 consisting of several converter modules 1-4. A master controller 10 transmits control signals to the slave controllers. A slave controller is co-located to a converter module 1-4 and is endowed with communication, as shown in FIG. 2 as the wireless nodes $N_{1-4}$, and processing capability, and each local or slave controller is preferably directly connected to the power electronics gates of its module.

The power outputs of the converter modules are connected to achieve the desired total output power. Hence, the switching commands to the gates in all modules must be synchronized to the accuracy of some microseconds μs.

Options for distribution of intelligence between the controllers and the ensuing communication between master and slaves are, with decreasing requirements on the communication links in terms of speed:

According to another embodiment, Op 2, Option 2, encoded switching commands is described as follows. The master or controller 10 performs the PWM resulting in a value of $t_i$. It encodes this value, or possibly several subsequent values, in a digital message and transmits the message to the slave $N_{1-4}$. The slave issues the switching command to its gates at time $t_i$ based on its local clock. The communication link may be slower, but it is required that the slaves synchronize their clocks to the accuracy of some microseconds μs. (There may be delay issues which make this option difficult.)

Time division multiple access (TDMA) is the preferred communication protocol for wireless master to slaves communication. For each slave, a fixed periodic timeslots is allocated to the communication between the slave and the master. This guarantees deterministic behavior of the data transmission. For example a wireless radio protocol from ABB called WISA (Wireless Interface for Sensors and Actuators) uses TDMA.

Options 2 to 4 require synchronization of the clocks in the slaves. [6] suggests to perform this synchronization by taking advantage of the timing implied in the TDMA protocol.

The wireless air interface and protocol is designed such that wireless packets may only be transmitted in precisely defined slots on a periodically repeated timing frame or a timing grid. A defined number of slots build up a timing frame. The master (the controller) is the timing master. All or some of the packets from the master contain the slot number and may also contain more coarse timing information such as, for example, frame number.

It is assumed that each node $N_{1-4}$ has a local timer and some processing capability. A node makes use of the timing information built into all wireless packets coming from the master, even those not addressed to the node itself. Every time a node detects a packet, it adjusts its internal timer. To maintain a desired timing resolution, the individual clock frequencies in the nodes must not be allowed to drift more than a defined amount in between such adjustments. This can be achieved by either more expensive clock crystal in the node, or more frequent adjustments in the form of packets from the master.

For the latter, if ordinary control-decision packets are too infrequent, dummy packets can be inserted at regular intervals; at most one packet in every slot. This way, a common notion of time can be maintained in all the nodes with a timing resolution at least as good as the slot-border precision, often in the range of +/− half the bit or symbol duration, that is built into the wireless air interface. A given node can maintain this system time independent of how often, and in which slots, its own control packets arrive.

Flowchart FIG. 3 shows a series of actions for carrying out the method. It shows:

30 Controller 10 transmits data packets to the slaves or nodes $N_1$-$N_4$ arranged local to each converter 1-4

32 Local node processes received transmission, addressed to the node or not, extracts time synchronisation information and updates local clock 33 Local node processes received transmission and processes any control signals addressed to the node 35 Local node sends a switch signal to the converter at time $t_i$ At step 33 the time synchronisation information may be extracted from the data packets in different ways. From a synch code, a slot number, a frame number, or a combination of any of these.

Control packets need to contain control information for on/off switching as well as information about the point(s) in time in the near future when switching shall take place. Because precise timing can be maintained separately, as described above, the control loop cycle time needs only to support the on/off decision rate which is normally much more relaxed.

An example of a wireless protocol is the above mentioned wireless radio protocol WISA—Wireless Interface to Sensors and Actuators from ABB. The WISA master transmits packets back-to-back almost continuously. The packets are either addressed to specific nodes, or dummy packets. It provides a timing resolution down to +/−0.5 microseconds, whereas packets to any specific node can be transmitted in terms of milliseconds, for example every ~2 ms.

According to another preferred embodiment a communication may be arranged as shown by Op 3. Option 3 in FIG. 2 describes transmission of reference signal (a type of distributed PWM 1): Samples of the reference signal $s_k$ are multicast periodically from the master or controller 10 to the slaves, say once per ms. Given this reference signal, each slave $N_{1-4}$ may use a locally generated carrier to determine the switching instant $t_i$. The multicast communication link may be even slower, but again slave synchronization is required.

According to another preferred embodiment a different communication method is used. Op 4, Option 4, in which transmission of control parameters (distributed PWM 2) takes place: Where the reference signal can be described by some few and only slowly varying control parameters CP (such as the modulation index), the master controller may send these parameters over a slow communication link. PWM generation is then fully done in the slaves, which must be synchronized. The communication can be done on slow links, but this option is less flexible than option 3.

The controller 10 may be connected to a node of a wireless LAN, and/or may be another kind of wireless node, running any radio protocol suitable for an industrial milieu, such as any standard issued by the Bluetooth Special Interest Group (SIG), any variation of IEEE-802.11, WiFi, Ultra Wide Band (UWB), ZigBee or IEEE-802.15.4, IEEE-802.13 or equivalent, or similar. A radio technology working in the ISM band with significant interference suppression means such as by spread spectrum technology may be preferred. Wireless communication may also be carried out using optical links, including for example Infra Red (IR) means and protocols such as IrDA, IrCOMM or similar. Wireless communication may also be carried out using a magnetic coupling or electrostatic coupling. Wireless IR communication may be carried out for example by an over the air method also referred to as diffuse IR.

The methods of embodiments such as in FIG. 3 as described above and elsewhere in this specification may be carried out by a computer application comprising computer program elements or software code which, when loaded in a processor or computer, causes the computer or processor to carry out the method steps.

The functions of the methods for synchronising the clock and for processing the switching signals and producing the switching signals may be carried out by processing digital functions, algorithms and/or computer programs and/or by analogue components or analogue circuits or by a combination of both digital and analogue functions. Similarly the methods may be run using configurable hardware components such as one or more FPGA chips (Field Programmable Gate Array). Other types of hardware may also be used, such as a Complex Programmable Logic Device (CPLD) or an Application Specific Integrated Circuit (ASIC) may be used.

The methods of the invention may, as previously described, be carried out by means of one or more computer programs comprising computer program code elements or software code portions that make the computer perform the method using equations, algorithms, data, stored values and calculations previously described. A part of the program may be stored in a processor as above, but also in a ROM, RAM, PROM, EPROM or EEPROM chip or similar memory means. The program in part or in whole may also be stored on, or in, other suitable computer readable medium such as a magnetic disk, CD-ROM or DVD disk, hard disk, magneto-optical memory storage means, in volatile memory, in flash memory, as firmware, stored on a data server or on one or more arrays of data servers. Other known and suitable media, including removable memory media such as memory sticks and other removable flash memories, hard drives etc. may also be used.

REFERENCES

[2] Nikola Celanovic, Luc Meysenc, Michael Mazur, Paul Rudolf, "Signal transmission system for activating a power semiconductor switch, and a converter equipped with a signal transmission system of this type". Patent Application, ABB Research, WO 2006/039823 A2, Priority date 2005 Oct. 4.

[3] Stéphane Bréhaut, François Costa, "Gate driving of high power IGBT by wireless transmission," CES/IEEE 5th International Power Electronics and Motion Control Conference, IPEMC 2006, 14-16 Aug. 2006.

[5] "APEC 2009: Wireless driving of IGBT," Power Electronics Europe, Issue 3, 2009.

It should be noted that while the above describes exemplifying embodiments of the invention, there are several variations and modifications which may be made to the disclosed solution without departing from the scope of the present invention as defined in the appended claims. Thus the invention may be practiced in connection with electronic frequency converters of different types, and controlled according to different control methods which are not limited to PWM or DTC. In particular the invention is not limited to use with TDMA wireless protocols only but may be applied using any wireless protocol that can transmit information that may be used to provide time synchronization.

What is claimed is:

1. A method for controlling a modular converter connected to a power supply network,
   wherein the modular converter comprises several converter modules comprising high-power semiconductor devices, the converter modules having their power outputs connected, and
   slave controllers each associated with a respective converter module, the slave controllers being endowed with communication and processing capability,
   wherein control signals are sent between a master controller and a first slave controller of the slave controllers using a wireless communication system,
   the method comprising
   transmitting said control signals to the first slave controller according to a predetermined time slot allocation, the control signals including one or more data packets comprising control information and time synchronization information of the wireless communication system for synchronizing a clock of the first slave controller with other of the slave controllers to achieve the desired total power output, the control signals further including a time value when a switching action of a converter module of the converter modules shall take place.

2. The method according to claim 1, comprising transmitting said control signals in the one or more data packets to the first slave controller according to a predetermined time slot allocation comprising the time synchronization information of said wireless communication system.

3. The method according to claim 1 comprising transmitting the one or more data packets to the first slave controller comprising information with a schedule of information about at which point or points in time in the near future when switching shall take place.

4. The method according to claim 1, comprising transmitting the one or more data packets from the master controller to each of the slave controllers in which the time synchronization information of the wireless communication system is determined by a code or synch word in a time slot in a frame of the wireless transmission.

5. The method according to claim 1, comprising transmitting the one or more data packets from said master controller to the first slave controller in which the time synchronization information of the wireless communication system is determined by a code or synch word in a time slot, or a frame number, or both.

6. The method according to claim 1, comprising receiving the one or more data packets according to the predetermined time slot allocation at one of the slave controllers arranged at one of the converter modules and synchronizing the clock of the one of the slave controllers according to time information indicating an absolute time in the one or more data packets in a frame.

7. The method according to claim 1, comprising receiving at one of the slave controllers arranged at one of the converter modules the one or more data packets according to the predetermined time slot allocation and not addressed to the one of the slave controllers and synchronizing the clock of the one of the slave controllers dependent on the time synchronization information in the one or more data packets.

8. The method according to claim 1, comprising transmitting the time synchronization information of the wireless communication system data packets by means of a predetermined time slot allocation wherein the time synchronization information in the one or more data packets is given by the predetermined time slot allocated to controller-to-slave controller communication in a frame from the master controller.

9. The method according to claim 1, comprising transmitting the time synchronization information of the wireless communication system packets by means of a predetermined time slot allocation using a wireless technology comprising any from the group of: wireless radio, optical link, IR diffuse, IR optical link, magnetic coupling, electrostatic coupling.

10. A system for control of a modular converter connected to a power supply network,
    the modular converter comprising several converter modules comprising high-power semiconductor devices, the converter modules having their power outputs connected, and
    slave controllers each associated with a respective converter module, the slave controllers being endowed with communication and processing capability,
    wherein control signals are sent between a master controller and a first slave controller of the slave controllers using a wireless communication system,
    wherein the system comprises at least one wireless transmitter for transmitting said control signals to the first slave controller, the at least one wireless transmitter being configured for sending one or more data packets to the first slave controller, the control signals comprising control information and time information arranged for synchronization of a clock of the first slave controller with other of the slave controllers to achieve a desired total power output,
    wherein one or more of the slave controllers synchronizes its clock dependent on the time information in the one or more data packets not addressed to the one or more of the slave controllers.

11. The system according to claim 10, wherein one or more of the slave controllers each comprise a wireless receiver arranged at the modular converter.

12. The system according to claim 10, wherein one or more of the slave controllers comprises a processor having an internal memory with a computer program product loaded therein comprising software code portions for synchronizing a clock of the one or more of the slave controllers dependent on the time information in the one or more data packets.

13. The system according to claim 10, wherein one or more of the slave controllers comprises a processor having an internal memory with a computer program product loaded therein, comprising software code portions for processing encoded control or switching signals for a converter module of the converter modules and for synchronizing a clock of the one or more of the slave controllers dependent on the time information in the one or more data packets.

14. The system according to claim 10, wherein one or more of the slave controllers comprises a processor having an internal memory with a computer program product loaded therein, comprising software code portions for synchronizing a clock of the one or more of the slave controllers dependent on wirelessly received information with a schedule of when and at which point or points in time in the near future switching of the modular converter shall take place.

15. The system according to claim 10, wherein one or more of the slave controllers comprises a processor having an internal memory with a computer program product loaded therein, comprising software code portions for synchronizing a clock of the one or more of the slave controllers dependent on the time information in a communication protocol frame comprising the one or more data packets.

16. The system according to claim 10, wherein one or more of the slave controllers comprises a processor having a configurable hardware configured for carrying out a part of a method of synchronizing a clock of the one or more of the slave controllers dependent on the time information in the one or more data packets.

17. The system according to claim 10, wherein one or more of the slave controllers comprises a processor having a configurable hardware configured for carrying out a part of a method of synchronizing a clock of the one or more of the slave controllers dependent on the time information in the one or more data packets not addressed to the one or more of the slave controllers.

18. The system according to claim 10, wherein one or more of the slave controllers comprises a processor having a configurable hardware configured for carrying out a part of a method for processing encoded control or switching signals for a modular converter of the converter modules and/or for synchronizing a clock of the one or more of the slave controllers dependent on the time information in the one or more data packets.

19. The system according to claim 10, wherein the slave controllers are compatible with a time division multiplex wireless communication protocol.

20. The system according to claim 10, wherein the wireless communication system is arranged for transmission of data packets by means of a predetermined time slot allocation using a wireless technology comprising any from the group of: wireless radio, optical link, IR diffuse, IR optical link, magnetic coupling, electrostatic coupling.

21. A computer program for controlling a modular converter connected to a power supply network comprising software code portions or computer code stored on non-transitory computer readable media that cause a computer or processor to carry out the steps of a method for controlling the modular converter connected to the power supply network,
wherein the modular converter comprises several converter modules comprising high-power semiconductor devices, the converter modules having their power outputs connected, and
slave controllers each associated with a respective converter module, the slave controllers being endowed with communication and processing capability,
wherein control signals are sent between a master controller and a first slave controller of the slave controllers according to a predetermined time slot allocation using a wireless communication system,
the method comprising
transmitting said control signals to the first slave controller, the control signals including one or more data packets comprising control information and time synchronization information of the wireless communication system for synchronizing a clock of the first slave controller with other of the slave controllers to achieve the desired total power output, the control signals further including a time value when a switching action of a converter module of the converter modules shall take place.

22. A computer program product directly loadable into the internal memory of a digital computer comprising software code portions stored on non-transitory computer readable media and run on a computer to perform a method for controlling a modular converter connected to a power supply network,
wherein the modular converter comprises several converter modules comprising high-power semiconductor devices, the converter modules having their power outputs connected, and
slave controllers each associated with a respective converter module, the slave controllers being endowed with communication and processing capability,
wherein control signals are sent between a master controller and a first slave controller of the slave controllers using a wireless communication system,
the method comprising
transmitting said control signals to the first slave controller, the control signals including one or more data packets comprising control information and time synchronization information of the wireless communication system for synchronizing a clock of the first slave controller with other of the slave controllers to achieve the desired total power output,
wherein one or more of the slave controllers synchronizes its clock dependent on the time information in the one or more data packets not addressed to the one or more of the slave controllers.

* * * * *